United States Patent [19]
Gagnon

[11] Patent Number: 5,650,610
[45] Date of Patent: Jul. 22, 1997

[54] APPARATUS AND METHOD FOR REMOTE DETECTION OF ICE OR OTHER BIREFRINGENT MATERIAL ON A SURFACE

[75] Inventor: Robert E. Gagnon, St. John's, Canada

[73] Assignee: National Research Council of Canada, Montreal, Canada

[21] Appl. No.: 404,753

[22] Filed: Mar. 15, 1995

[51] Int. Cl.$^6$ .................................................. G02F 1/01
[52] U.S. Cl. ........................... 250/225; 356/368; 340/583
[58] Field of Search ................................. 250/225, 216; 356/365, 364, 369, 366, 367, 370; 340/580, 581, 583, 600

[56] References Cited

U.S. PATENT DOCUMENTS

| | | | |
|---|---|---|---|
| 4,668,860 | 5/1987 | Anthon | 250/225 |
| 4,701,052 | 10/1987 | Schoen, Jr. | 356/369 |
| 4,725,145 | 2/1988 | Azzam | 356/367 |
| 5,170,049 | 12/1992 | De Jonge et al. | 250/225 |
| 5,243,185 | 9/1993 | Blackwood | 250/225 |

*Primary Examiner*—Edward P. Westin
*Assistant Examiner*—John R. Lee
*Attorney, Agent, or Firm*—Neil Teitelbaum & Associates

[57] ABSTRACT

An apparatus and method are provided for remotely detecting ice on a polarization preserving surface. A target location on the surface is irradiated with two cross-polarized beams of coherent light. A determination is then made as to whether the speckle patterns from each of the two beams interfere with one another. If interference of the speckle patterns from the two beams is detected, ice or some other birefringent material is said to be present on the surface.

17 Claims, 3 Drawing Sheets

5,650,610

APPARATUS AND METHOD FOR REMOTE DETECTION OF ICE OR OTHER BIREFRINGENT MATERIAL ON A SURFACE

FIELD OF THE INVENTION

This invention relates to the detection of birefringent material such as ice and more particularly, relates to a method and device for remotely detecting ice on a polarization preserving surface.

BACKGROUND OF THE INVENTION

The presence of ice on a surface can be detected by electrical, acoustical, mechanical and optical devices. Most of these devices are used to determine the presence of or characteristics of ice on aircraft. In a report No. DOT/FAA/CT-92/27 entitled "Aircraft Ice Detectors and Related Technologies for Onground and Inflight Applications", published in 1993 and authored by Gregory A. Hoover, Galaxy Scientific Corporation, for the U.S. Department of Transportation, Federal Aviation Administration, Technical Centre, Hoover describes several existing technologies for ice detection.

In U.S. Pat. No. 5,243,185 entitled Apparatus and Method for Ice Detection, in the name of Carl Blackwood, various patents related ice detection are described. For example, U.S. Pat. No. 4,701,052 in the name of Schoen discloses a dew point hygrometer that uses linearly-polarized fight to detect condensate on a metal surface. Schoen declares the presence of condensation when a light detector receives on light form an analyzer.

Another U.S. Pat. No. 4,725,145 in the name of Azzam is described as disclosing a polarimeter from which one parameter of polarization of light beam can be determined. The Azzam invention is a polarization sensitive photodetector that produces an output proportional to the radiation absorbed by the photodetector.

U.S. Pat. No. 4,668,860 (Anthon) discloses a scattermeter for evaluating the surface quality of an optical element, wherein surface scatter is distinguished form bulk scatter by differing polarization characteristics. Neither Azzam nor Anthon incorporate the intrinsic birefringent properties of the hexagonal crystalline structure of the ice crystal.

Blackwood, in U.S. Pat. No. 5,243,185, on the other hand uses the birefringent properties of the ice crystal to determine its presence on a polarization preserving surface. Blackwood discloses an apparatus and method that analyzes elliptically-polarized reflection of linearly-polarized radiation from an ice-covered surface. A linearly-polarized radiation beam (15) is focused on a target surface (20), and returned radiation (25) is filtered (30) as a function of its elliptical polarization. Filtered radiation (35) is directed to a sensor (40) and quantified according to the intensity of radiation received at various points ($41_1$–$41_n$) on the filter (30), and an output signal for each point is produced ($45_1$–$45_n$). The presence of ice is detected by a signal processor that detects a variance among the output signals. Although Blackwood's invention appears to adequately perform its intended function of detecting as polycrystalline structure on a polarization preserving surface, it provides a complex solution to the problem of detecting ice. Furthermore, Blackwood's invention is not related to detecting a single crystalline layer of ice on a target surface.

It is an object of this invention to provide a method and device for simply, remotely detecting the presence of birefringent material on a polarization preserving surface.

It is a further object of this invention to provide an relatively inexpensive system to manufacture, for remote detection of ice.

SUMMARY OF THE INVENTION

In accordance with the invention there is provided, a method of detecting the presence or absence of birefringent material on a polarization-preserving target surface, comprising the steps of:

a) irradiating a location on a target surface with at least two beams of coherent, polarized light, the at least two beams being cross polarized with respect to each other; and, b) allowing the at least two beams to reflect off of the irradiated location of the target surface, in the form of a speckle patterns, each beam having an associated speckle pattern;

c) determining if the speckle patterns from the at least two beams interfere with each other, wherein the interference of the speckle patterns, other than a small interference due to imperfections in the polarization-preserving surface, indicates the presence of birefringent material on the target surface.

In accordance with another aspect of the invention, there is provided, a system for detecting the presence of ice on a polarization-preserving target surface, comprising: means for irradiating a location on a target surface with two beams of coherent, polarized light, the two beams being cross polarized with respect to each other and being substantially equal in intensity; and, means for detecting whether the interference speckle patterns from the two coherent polarized beams of light interfere with each other at the target location, wherein the interference of the speckle patterns, other than a small interference due to imperfections in the polarization-preserving surface, indicates the presence of ice on the target surface.

BRIEF DESCRIPTION OF THE DRAWINGS

Exemplary embodiments of the invention will be described in conjunction with the drawings in which.

DETAILED DESCRIPTION

Figure 1A:
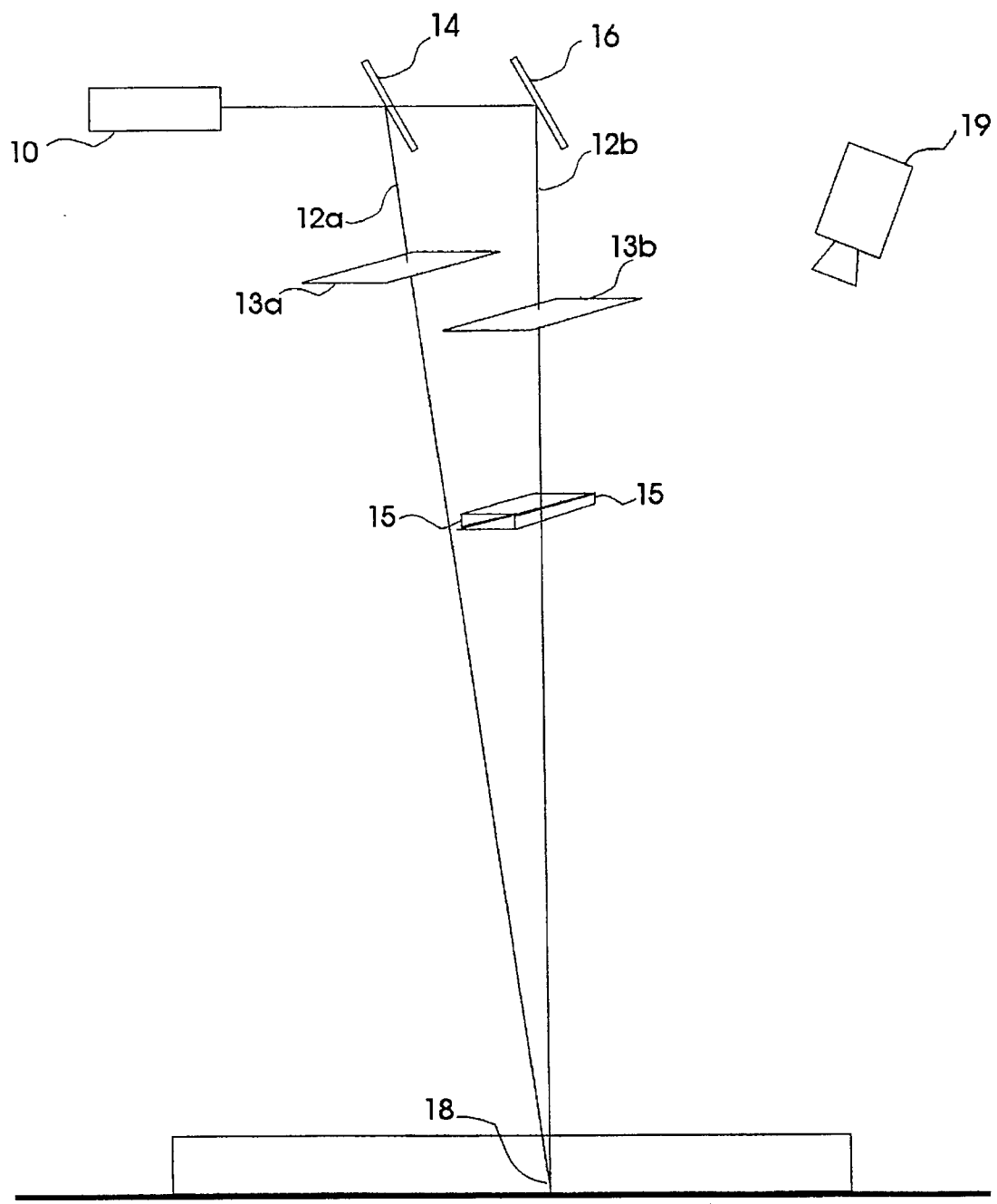
FIG. 1a is a schematic diagram of one embodiment of a detection system in accordance with this invention.

Referring now to FIG. 1a, a coherent light beam, by way of example shown to be a laser beam 12, generated by a laser generating means 10 split into two beams after passing through a partially-mirrored glass plate 14; the glass plate splits the beam 12 so that half of it is reflected and half is transmitted through the plate 14. The transmitted portion of the beam 12b is subsequently reflected from a mirror 16 and directed to a target location 18 on the surface of interest. The glass plate 14 and the mirror 16 should be rigid with respect to one another. The reflected portion of the beam 12a is also directed to the same spot on the target location 18. Cross polarizing filters 13a and 13b are shown in the path of the two beams directed at the target location 18 and ensure that the beams are cross polarized with respect each other.

Figure 1B:
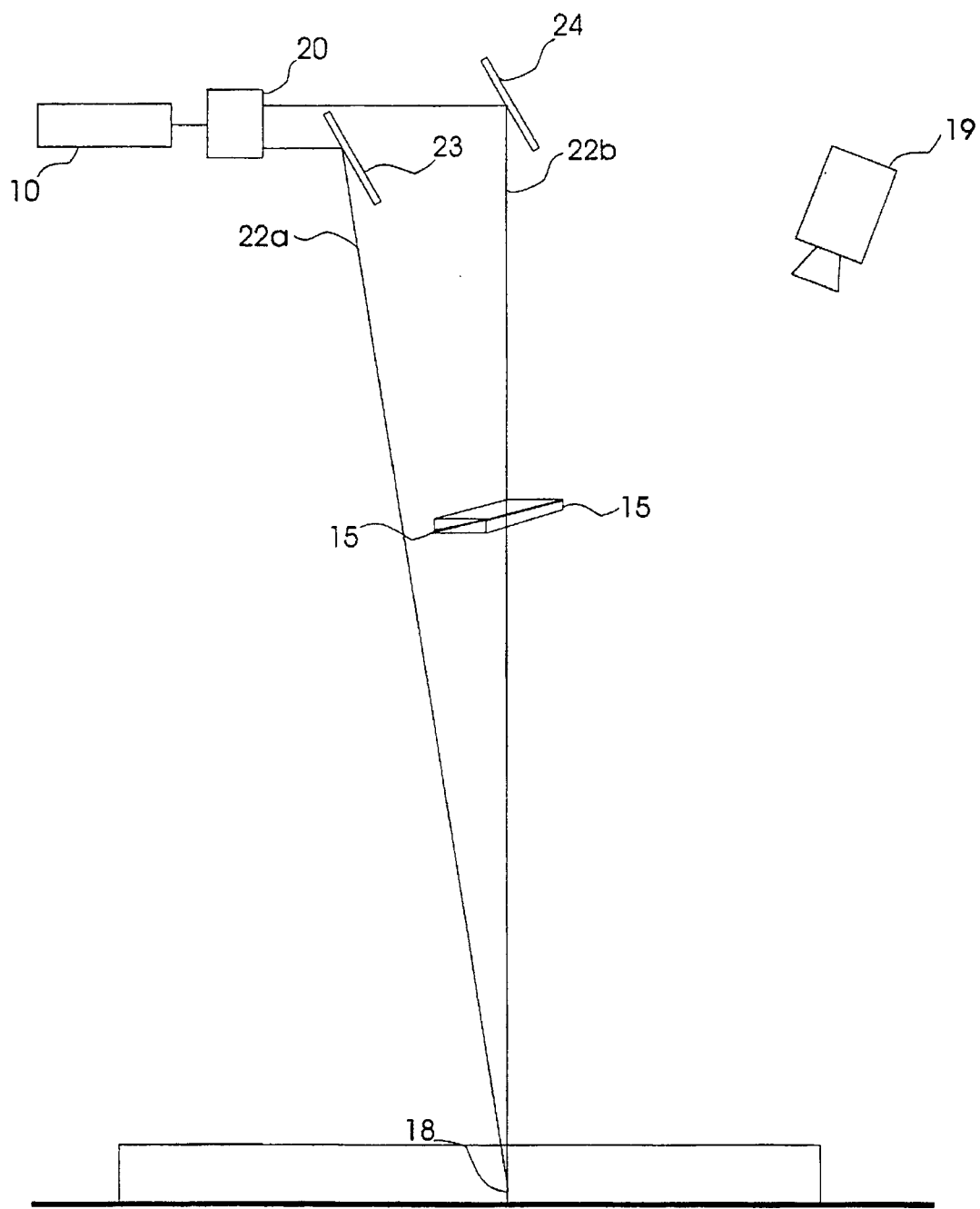
FIG. 1b is a schematic diagram of an alternative embodiment of a detection system in accordance with an embodiment of the invention.

Alternatively, as is shown in FIG. 1b, a calcite crystal 20 can be used to split the beam 12 into two cross polarized beams 22a and 22b of equal intensity. In the embodiment shown in FIG. 1b, two rigid mirrors 23 and 24 are then used to direct the two beams 22a and 22b to the same spot on the target location 18. The mirrors 23, and partially-mirrored glass plate 14 and mirror 16 in the first configuration, should at least be rigid with respect to each other so that the optical path length between them remains constant. By using appropriate focusing optics within the laser 10 the diameter of the laser beams striking the surface is about 1 mm. Commercially available diode lasers and optical assemblies can provide focused laser beams at distances ranging from 0 to greater than 15 meters.

Figure 2A:
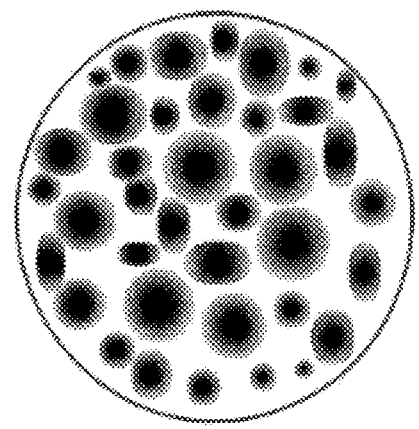
FIG. 2a is a pictorial view of an overlapping speckle pattern with no interference.
Figure 2B:
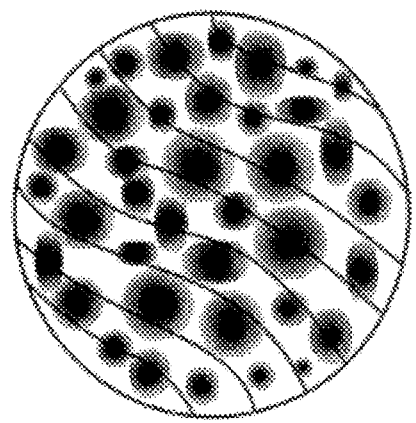
FIG. 2b is a pictorial view of an overlapping speckle pattern with interference.

In operation, each laser beam of linearly polarized radiation incident upon the target location 18, creates its own speckle pattern; the speckle pattern occurs as a function of the diffuse reflection of coherent light from the target surface. When the two beams impinge upon a non-polarization preserving surface, the two non-polarized speckle patterns interfere to produce an observable interference pattern as is shown in FIG. 2b. In contrast, FIG. 2a shows an overlapping speckle pattern with no interference pattern, which results when the beams impinge on a polarization preserving surface. A viewing instrument such as a defocused video camera 19 shown in FIG. 1a, is provided to detect the interference pattern in the overlapping speckle images; in effect, the system operates as a speckle interferometer. The video camera provides an image of the speckle pattern, either for manual viewing or for digital analysis so that a determination can be made as to whether an interference pattern is present. Advantageously, the lens on the video camera 19 provides a means to vary the size of the image. However, the camera should be out of focus to some extent, otherwise the speckle pattern that enters the lens becomes focused to a point, and nothing is discernible. Of course the video camera 19 is not essential and a CCD device itself can be used to capture the image. Furthermore, as will be described, a photodiode (not shown) can be used in place of the video camera 19 as a means to detect the interference pattern in the overlapping speckle images.

In a preferred embodiment, means, by way of example, in the form of two transparent wedges 15 shown in FIGS. 1a and 1b are provided for changing the optical path length of one of the beams. By continually varying the path length by a small amount, any interference fringes observed are seen as moving fringes or at least are seen as a moving pattern having varying intensity at a given location; this change in intensity at a particular location is monitored and yields a more definitive, observable phenomenon and test for the overlapping speckle patterns. Alternatively, in place of the wedges 15, a glass plate may be positioned in the path of one of the beams; continuously varying the angle of the glass plate by tilting it continuously varies the path length of one of the beams. Both of these path length varying means should not displace the beam by a significant amount.

Focusing the laser beams enhances the interference pattern, however, an interference pattern is visible even when the beams are not focused. In the case of the focused laser beams the spacing between interference fringes is greatest when the beams precisely overlap on the target surface. If they are partially overlapping the fringe spacing is reduced. FIG. 2b is representative of the type of interference pattern that occurs when the laser beams are focussed and closely overlapping. Depending on the texture of the target surface and the degree of beam focussing and closeness of overlap on the surface, the pattern may be quite random in shape. However, the interference is clearly discernible when the optical path length of one of the beams is continuously altered.

Means in the form of a target-facing photodiode for detecting the light intensity at some small area in the field of view are not shown in the figures, but can replace the video camera 19 shown in FIGS. 1a and 1b; when oscillating or varying interference fringes are present the photodiode provides an output signal representative of the varying intensity of the portion of the interference fringes that are monitored.

When the surface at the target location 18 preserves the polarization of radiation incident upon it, for example as a metal surface does, then the two oppositely polarized overlapping speckle patterns that are created will not interfere to produce an interference pattern, or, at least the intensity of the interference pattern will be much less intense than when the two oppositely polarized beams impinge upon a non-polarization preserving surface. When the metallic surface is bare, or is covered with a layer of liquid such as water or deicing fluid, then the speckle patterns do not interfere significantly and interference fringes are not observed. In contrast, the presence of a layer of birefringent material such as ice on the target surface 18, causes the beams to split into "ordinary" and "extraordinary" components that are parallel and normal to the projection of the c-axis of the ice crystal that the beams pass through. If the projection of the c-axis of the crystal is not exactly aligned with the direction of polarization of either laser beam, (a most likely case,) then the components of the laser beams produce speckle patterns that interfere and an interference pattern becomes visible. This signifies the presence of birefringent material at the target location 18. To avoid confusion with the unlikely occurrence of coincidental alignment of one of the polarized beams with the c-axis of an ice crystal on the surface being tested, a second observation could be made after rotating the polarization of the beams 12a and 12b by 45 degrees. Alternatively, a second speckle interferometer having the polarization of its laser beams at 45 degrees to the laser beams 12a and 12b of the first interferometer, can be directed at the same location 18. If an interference pattern is detected from one of the two interferometers, then birefringent material is said to be present. This eliminates confusion over the random, unlikely occurrence of coincidental alignment of one of the beams with the c-axis. As mentioned above, the interference fringes can be detected using a photodiode that is directed at the target. When a determination is made that the detected varying intensity reaches or exceeds a predetermined threshold, ice or some birefringent material is said to be present at the target location.

Of course, metallic paint or adhesive tape having polarizing preserving properties can be applied to portions of aircraft that are not polarization preserving.

In situations where the detector, CCD or photodiode, is so far away that the intensity of the interference fringes are not bright enough to detect, then a suitably defocused light-gathering telephoto lens will permit viewing and detection. In experiments the apparatus of this invention performed quite well operating at distances of up to 3 meters, using a video camcorder which had a 10× telephoto lens as the detector. Hence, the apparatus could be used on board an aircraft to view various components, or could be used on the ground to asses the need for, or effectiveness of, deicing fluid.

Advantageously, the method of this invention provides a simple method for testing for birefringent material on a target surface that does not require physically taking samples from the area to be tested. Unlike other known more passive tests, this method of detection requires only a small amount of signal processing. The method in accordance with this invention is useful for detection of both single and polycrystalline ice crystals.

Numerous other embodiments may be envisaged without departing from the spirit and scope of this invention.

What I claim is:

1. A method of detecting the presence or absence of birefringent material on a polarization-preserving target surface, comprising the steps of:
    a) irradiating a location on a target surface with at least two beams of coherent, polarized light, the at least two beams being cross polarized with respect to each other; and,
    b) allowing the at least two beams to reflect off of the irradiated location of the target surface, in the form of a speckle patterns, each beam having an associated speckle pattern;
    c) determining if the speckle patterns from the at least two beams interfere with each other, wherein the interference of the speckle patterns, other than a small interference due to imperfections in the polarization-preserving surface, indicates the presence of birefringent material on the target surface.

2. A method of detecting the presence of ice on a polarization-preserving target surface, comprising the steps of:
    a) irradiating a location on a target surface with two beams of coherent, polarized light, the two beams being cross polarized with respect to each other and being substantially equal in intensity; and,
    b) allowing the beams of coherent, polarized light to reflect off of the irradiated location of the target surface, in the form of a speckle patterns, each beam having an associated speckle pattern;
    c) detecting interference of speckle patterns from the two beams when they interfere with each other, wherein the interference of the speckle patterns, other than a small interference due to imperfections in the polarization-preserving surface, indicates the presence of ice on the target surface.

3. A method of detecting the presence of ice as defined in claim 2, wherein the step of detecting the interference of the speckle patterns is performed by viewing the patterns with a defocused video camera.

4. A method of detecting the presence of ice as defined in claim 2, including the step of varying a path length of one of the beams in order to cause the interference fringes to move.

5. A method of detecting the presence of ice as defined in claim 4, including the step of varying a path length of one of the two beams by a small predetermined amount in such a manner as to shorten the path and lengthen the path length of one of the two beams repeatedly for a duration, so that fringes of the interfering speckle patterns observed at a particular location vary.

6. A method of detecting the presence of ice as defined in claim 5, wherein step (c) of claim 2 includes the step of detecting variation in intensity of the speckle patterns observed at the particular location.

7. A method of detecting the presence of ice as defined in claim 6, wherein the step of detecting variation in intensity of the overlapping speckle patterns comprises the step of performing said detection in conjunction with applying a threshold of variation, wherein a variation greater than a predetermined minimum variation is said to indicate the presence of ice on the polarization-preserving target surface.

8. The method of detecting the presence of ice as defined in claim 2 wherein steps (a), (b) and (c) of claim 2 are repeated with two other beams which are cross polarized with respect to each other, said two other beams having a different polarization than the two beams defined in claim 2.

9. A system for detecting the presence of ice on a polarization-preserving target surface, comprising:
    a) means for irradiating a location on a target surface with two beams of coherent, polarized light, the two beams being cross polarized with respect to each other and being substantially equal in intensity; and,
    b) means for detecting interference of overlapping speckle patterns from the two coherent polarized beams impinging upon the target surface, wherein the interference of the speckle patterns, other than a small interference due to imperfections in the polarization-preserving surface, indicates the presence of ice on the target surface.

10. A device as defined in claim 9 wherein the means for detecting the interference includes a defocused video camera for use in detecting the interference of the overlapping speckle patterns.

11. A device as defined in claim 9 including means for varying a path length of one of the beams in order to cause interference fringes present in the interference of the speckle patterns to move.

12. A device as defined in claim 11, wherein the means for varying the path length comprises a pair of transparent wedges placed in the path of one of the two beams of light.

13. A device as defined in claim 11, wherein the means for varying the path length comprises a substantially transparent glass plate.

14. A device as defined in claim 9 wherein the means for detecting the interference speckle patterns includes means for detecting a variation in intensity at particular location in the overlapping speckle pattern.

15. A device as defined in claim 9 wherein the means for detecting a variation in intensity at a location in the overlapping speckle patterns includes a thresholding means such that when a predetermined threshold is reached, a signal is generated indicative of the presence of ice on the polarization-preserving target surface.

16. A device as defined in claim 9, including means for irradiating the location on the target surface with two other beams of coherent, polarized light, the two beams being cross polarized with respect to each other and having a different polarization than the two other beams.

17. A device as defined in claim 9 wherein the means for detecting the interference of speckle patterns from the two coherent polarized beams of light striking the target includes at least one photodiode for converting a portion of overlapping speckle pattern to an electrical signal.

* * * * *